July 10, 1934. J. M. HENDRICKSON Re. 19,234

ELECTRICAL SWITCH

Original Filed March 6, 1931

INVENTOR

James M. Hendrickson

By Edward A. Lawrence his attorney

Reissued July 10, 1934

Re. 19,234

UNITED STATES PATENT OFFICE 19,234

ELECTRICAL SWITCH

James M. Hendrickson, McKeesport, Pa.

Original No. 1,866,596, dated July 12, 1932, Serial No. 520,731, March 6, 1931. Application for reissue and division April 24, 1934, Serial No. 722,218

4 Claims. (Cl. 200—52)

This patent application is a division of my application Serial No. 659,002, filed February 28, 1933, for reissue of Letters Patent No. 1,866,596.

My present invention relates to electrical switches of the type comprising a control tube which is arranged to tip to establish electric circuits.

For instance, one of the many uses or applications of such control switches is in connection with aircraft flight, the control tube or tubes tipping with the aircraft and establishing electrical connections which control or correct the flight, as for instance through solenoids which are connected up to operate the aileron and/or elevators and/or rudders.

In the accompanying drawing, wherein I have illustrated a practical embodiment of the principles of my invention, Fig. 1 is a side elevation of the control tube showing the same tipped.

Figure 1:
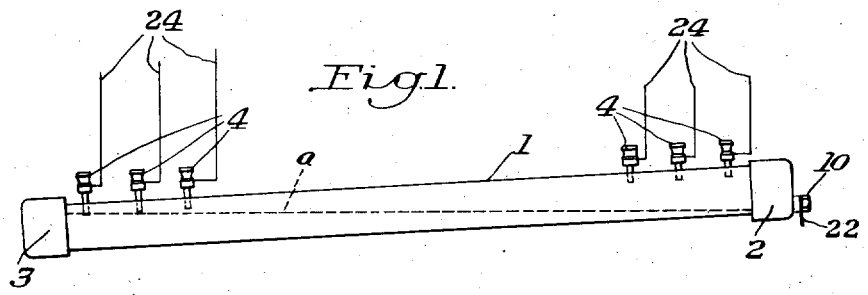
Figure 2:
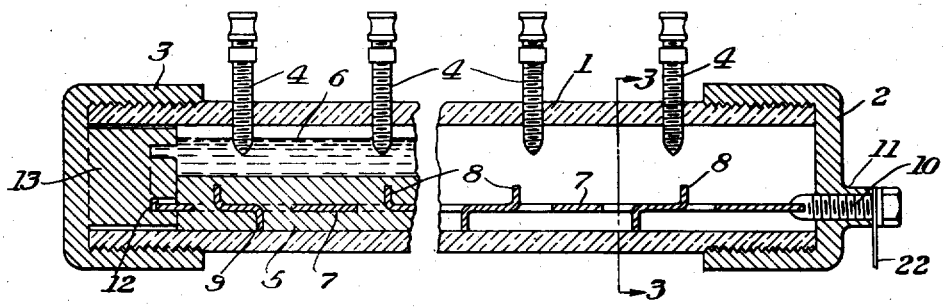
Fig. 2 is a broken longitudinal section of the tube on enlarged scale, the conductive liquid and the non-electrolytic fluid being shown only at one end.
Figure 3:
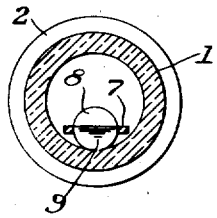
Fig. 3 is a cross-sectional view taken along the line 3—3 in Fig. 2.
Figure 4:
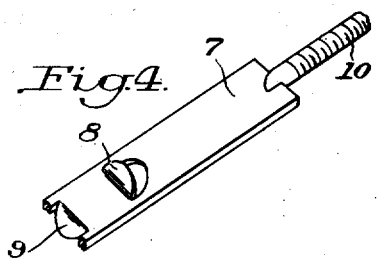
Fig. 4 is a broken perspective of the surge-preventer.

Referring to the drawing, 1 represents a tube formed of suitable non-conducting material. This material may be suitable glass, as illustrated in the drawing, but in practice a less fragile material, such as bakelite, is preferable. The ends of the tube are sealed by the caps 2 and 3 which may be screwed upon the ends of the tube or otherwise secured in place.

When used in aircraft flight-control, the tube is mounted on the craft in such manner as to be horizontal when the aircraft is in normal flight so as to tip with the aircraft.

Along its top center line and adjacent to either end of the tube the wall of the latter is provided with a series of spaced apart holes through which the contact posts 4 are downwardly inserted. The holes and the posts are threaded to secure the posts in position and also to permit an adjustment of the protrusion of the posts into the interior of the tube, thus adjusting the sensitivity of the stabilizer.

In the lower portion of the tube is contained a body 5 of liquid which is a good conductor of electricity, such as mercury. The top level of the liquid 5, when the tube is horizontal, is below the lower extremities of the posts 4. The posts are adjusted relative to the top level of the mercury to obtain the sensitivity desired in the operation of the control tube. Above the level of the mercury is a body 6 of non-electrolytic fluid, preferably a liquid of low viscosity, such, for instance, as carbon tetra-chloride. The posts must be of material which will not alloy with the mercury or other fluid.

When the tube is horizontal the lower ends of the posts are immersed in the liquid 6 and such liquid lies between the extremities of the posts and the mercury, thus preventing arcing or spark jumping.

I provide a surge-preventer for the mercury. Thus I have shown a bar 7 which is preferably flat and of material which will not alloy with the mercury or other fluid such as steel or iron. At intervals the material of the bar is cut and alternately bent upwardly and downwardly to form the fins 8 and 9, respectively, which fins are immersed in the mercury and prevent the mercury from surging as the tube is tipped. One end of the bar 7 is provided with a threaded contact post 10 which extends through a snugly fitting cylindrical neck 11 in the cap 2. The other or inner end of the bar 7 is suitably supported as by insertion into a slot 12 formed in the inner end of a cylindrical boss 13 of the cap 3. The slot 12 may be annular in form so that a portion thereof will always be properly disposed to receive the inner end of the bar 7. The surge-preventer acts as a conductor of the electric current.

22 represents the main feed conductor which supplies current from a suitable source, not shown, such as a dynamo or battery. The conductor 22 is connected to the binding post 10. From each of the contacts posts 4 a branch conductor 24 leads to the electrical apparatus or mechanism, such as a solenoid winding or sectional winding which is to be energized when the tube is tipped into position to connect electrically by immersion the inner end of the corresponding contact member 4 with the mercury 5.

In my said application Serial No. 659,002 the application of the above described switch mechanism to a practical use, aircraft flight control, is fully described.

When the tube 1 is in a horizontal position, as when the aircraft is in level flight, all the contact members 4 will be out of electrical contact with the mercury 5 and thus the circuits will all be open, but when the tube is tipped, as it is when the aircraft assumes a non-level position, the mercury will rise in the depressed end of the tube, as indicated by the line *a* in Fig. 1, thus bringing the mercury into electrical contact with the first contact member 4 at the left end of the tube and thus completing the circuit which includes the corresponding branch conductor 24 and the main conductor 22. In case the angle of tip is sufficient the next or the remaining contact members 4 at the left will be brought into electrical contact with the mercury, thus completing the circuit of the corresponding branch conductors 24 and the main conductor 22. A like result follows the tipping of the tube in the opposite direction.

Insomuch as mercury and similar conductive liquids are unstable, it is necessary to prevent the surging of the liquid, since otherwise intermittent contacts with the posts might ensue, confusing and impairing the operation of the automatic control. I am able by means of my surge-preventer to render the mercury stable. Again the use of the surge-preventer as a conductor of the current provides a route of less resistance through the mercury to the points of contact and lessens the resistance of the travel of the current through the mercury when contact is made.

The non-electrolytic fluid prevents the oxidation of the mercury which would render it too sluggish and also prevents the vaporization of the mercury due to spark gaps which would result in arcs.

The non-electrolyic substance should have no chemical reaction with the conductive liquid and should have so much less specific gravity that it will always remain superimposed on the mercury and will not form an emulsion therewith as a result of vibration.

What I claim is:—

1. In an electric switch to be interposed in a circuit, the combination of a tube, a liquid contained in the tube and having current-carrying characteristics, an electrode arranged to be connected to one part of the circuit and exposed interiorly of the tube, the liquid being out of contact with the electrode while the tube is substantially horizontal but making contact therewith when the tube is tipped to the necessary inclination, a metallic conductor disposed longitudinally of the tube and in constant electrical contact with the liquid, the conductor being arranged to be connected to the other part of the circuit, and means carried by the conductor to retard the travel of the liquid and thus prevent surging of the liquid in the tube.

2. In an electric switch to be interposed in a circuit, the combination of a tube, a liquid contained in the tube and having current-carrying characteristics, an electrode arranged to be connected to one part of the circuit and exposed interiorly of the tube, the liquid being out of contact with the electrode when the tube is substantially horizontal but making contact therewith when the tube is tipped to the necessary inclination, a metallic conductor disposed longitudinally of the tube and in constant electrical contact with the liquid, the conductor being arranged to be connected to the other part of the circuit, and fins on the conductor to prevent surging of the liquid to avoid accidental contact of the liquid with the electrode.

3. In an electric switch to be interposed in a system of circuits, the combination of a tube, a liquid contained in the tube and having current-carrying characteristics, a plurality of electrodes arranged to be connected to corresponding circuits of the system and exposed interiorly of the tube and arranged so that the liquid makes contact with the electrodes in turn as the tube is tipped, a metallic conductor disposed longtiudinally of the tube and in constant electrical contact with the liquid, the conductor being arranged to form the common return of the circuit, and means carried by the conductor to retard the travel of the liquid and thus prevent surging of the liquid in the tube.

4. In an electric switch to be interposed in a system of circuits, the combination of a tube having closed ends, a liquid contained in the tube and having current-carrying characteristics, a plurality of electrodes arranged to be connected to corresponding circuits of the system and exposed interiorly of the tube and arranged so that the liquid makes contact with the electrodes in turn as the tube is tipped, a metallic conductor disposed longitudinally of the tube and in constant electrical contact with the liquid, said conductor being arranged to form the common return of the circuits, and fins on the conductor to prevent surging of the liquid to avoid accidental contact of the liquid with the electrodes.

JAMES M. HENDRICKSON.